(12) United States Patent
Falco

(10) Patent No.: US 12,203,032 B2
(45) Date of Patent: Jan. 21, 2025

(54) APPARATUS FOR THE TREATMENT OF PLASTICS

(71) Applicant: DELTAGIZERO S.R.L., Milan (IT)

(72) Inventor: Giuseppe Falco, Sessa Aurunca (IT)

(73) Assignee: DELTAGIZERO S.R.L., Milan (IT)

( * ) Notice: Subject to any disclaimer, the term of this patent is extended or adjusted under 35 U.S.C. 154(b) by 66 days.

(21) Appl. No.: 18/030,482

(22) PCT Filed: Oct. 18, 2021

(86) PCT No.: PCT/IB2021/059564
§ 371 (c)(1),
(2) Date: Apr. 5, 2023

(87) PCT Pub. No.: WO2022/079698
PCT Pub. Date: Apr. 21, 2022

(65) Prior Publication Data
US 2023/0374389 A1    Nov. 23, 2023

(30) Foreign Application Priority Data
Oct. 16, 2020 (IT) .................. 102020000024501

(51) Int. Cl.
*C10B 49/18* (2006.01)
*C10B 53/07* (2006.01)

(52) U.S. Cl.
CPC ............ *C10B 49/18* (2013.01); *C10B 53/07* (2013.01)

(58) Field of Classification Search
CPC ................................ C10B 49/18; C10B 57/07
See application file for complete search history.

(56) References Cited

U.S. PATENT DOCUMENTS

| | | | | |
|---|---|---|---|---|
| 3,853,498 A * | 12/1974 | Bailie | ....................... | C10J 3/58 |
| | | | | 201/31 |
| 3,901,951 A * | 8/1975 | Nishizaki | ................ | C10B 49/10 |
| | | | | 521/40.5 |
| 4,007,093 A * | 2/1977 | Doilov | ...................... | C10B 1/04 |
| | | | | 201/34 |
| 4,083,751 A * | 4/1978 | Choi | ........................ | B03B 9/06 |
| | | | | 48/209 |
| 4,203,804 A * | 5/1980 | Janning | ................... | B29B 17/04 |
| | | | | 201/31 |

(Continued)

FOREIGN PATENT DOCUMENTS

| CN | 110066667 A | 7/2019 |
|---|---|---|
| EP | 0722815 A1 | 7/1996 |

*Primary Examiner* — Jonathan Miller
(74) *Attorney, Agent, or Firm* — Carmel Patent Agency; Robert Ballarini

(57) ABSTRACT

Apparatus for the pyrolysis treatment of plastics includes a vertically developing reactor which includes:
- a first zone, a second zone and a third zone which are in direct communication with each other, the first zone being vertically superimposed on the second zone and the second zone being vertically superimposed on the third zone,
- an inlet for high temperature particles, the inlet being arranged so that the particles fall by gravity into the second zone first passing through the first zone,
- a plurality of nozzles which are mounted in correspondence with the second zone for introducing the plastics in the molten state into the second zone, and
- a mechanical mixing device which is positioned and acts inside the third zone.

17 Claims, 7 Drawing Sheets

(56) References Cited

U.S. PATENT DOCUMENTS

| | | | | |
|---|---|---|---|---|
| 4,466,863 | A | | 8/1984 | Rammler |
| 4,584,421 | A | * | 4/1986 | Saito ........................ C10G 1/10 |
| | | | | 201/2.5 |
| 5,584,970 | A | * | 12/1996 | Schmalfeld ............. C10B 53/02 |
| | | | | 201/37 |
| 5,771,821 | A | * | 6/1998 | Zhuravsky ............... C10G 1/10 |
| | | | | 588/316 |
| 5,821,395 | A | * | 10/1998 | Price ........................ C10G 1/10 |
| | | | | 423/241 |
| 5,976,355 | A | * | 11/1999 | Johnson ................. C10G 11/18 |
| | | | | 208/119 |
| 6,011,187 | A | * | 1/2000 | Horizoe ................. B29B 17/02 |
| | | | | 201/2.5 |
| 6,534,689 | B1 | * | 3/2003 | Stankevitch ............. C10G 1/10 |
| | | | | 585/241 |
| 6,841,064 | B1 | | 1/2005 | Weiss et al. |
| 7,847,136 | B2 | * | 12/2010 | Nill .......................... C10G 1/10 |
| | | | | 422/135 |
| 8,475,726 | B2 | * | 7/2013 | Balint ..................... C10B 49/04 |
| | | | | 110/235 |
| 9,464,245 | B2 | * | 10/2016 | Gao ........................... B01J 8/28 |
| 2003/0047437 | A1 | * | 3/2003 | Stankevitch ............. C10G 1/10 |
| | | | | 201/25 |

\* cited by examiner

APPARATUS FOR THE TREATMENT OF PLASTICS

FIELD OF THE INVENTION

The present invention relates to an apparatus for the treatment of plastic materials. In particular, the present invention relates to an apparatus for the pyrolysis of plastic materials and, in more detail, for the oxygen-free thermal cracking of plastic materials.

BACKGROUND OF THE INVENTION

Industrial apparatuses are known which allow to thermally treat plastic materials in order to split the macromolecules which form them into simpler compounds which can be reused. This process is generally known as thermolysis or thermal cracking which, carried out in the absence of oxygen, is called pyrolysis.

The known industrial plants for the treatment of plastic materials comprise a reactor configured to operate at high temperatures, generally between 400° C. and 650° C., and into which the plastic materials to be treated are introduced. However, the known plants have a drawback linked to the poor thermal conductivity of the plastic polymeric materials which are inserted into the reactor. To overcome this problem, the expedient of shredding the plastic material to be treated inside the reactor is known, in order to increase the specific surface of the material itself, thus facilitating the heat exchange processes necessary to reach the process temperature. It is also known to use a reactor with wall heating, in which the walls of the reactor (generally made of steel, and therefore thermally conductive), are heated, for example by contact with a hot fluid or with a system of electric heaters. It is also known the idea of adding inside the reactor a tube bundle through which a hot fluid flows, in order to increase the contact area between the plastic materials present in the reactor and the heating elements. It is also known to add mechanical mixing devices inside the reactor, for example rotating blades, to mix the material present in the reactor in order to homogenize the temperature inside the reactor itself.

However, the known solutions are not fully satisfactory since the poor thermal conductivity of the plastic makes it difficult to obtain both the fast melting of the plastic material and a homogeneous temperature inside the reactor. Furthermore, the insertion of a rotating device that mixes the plastic material is particularly complicated from a construction and reliability point of view since it is necessary to create a device that can withstand considerable mechanical stress due to high temperatures and the presence of highly viscous melted material which is also characterized by high adhesiveness. Furthermore, the addition of the tube bundle allows to effectively heat only that portion of plastic material which is in contact with the tube bundle or is in its immediate proximity and, moreover, causes a reduction of the useful space inside the reactor, thus requiring to make constructive compromises, in particular if there is also a rotating mixing device. Therefore, at present, it is particularly complicated to obtain a homogeneous temperature inside the reactor so as to guarantee the conduction of the process at the desired optimum temperature.

The above problems of heating of the plastics to be treated cause a further problem linked to the products of the reaction. In particular, an incomplete pyrolysis reaction of plastic materials leads to the relevant formation of tarry (tar) or carbonaceous (char) products. The presence of these products is highly undesirable as, by adhering to the heated walls of the reactor (and of the tube bundle, if present), they would isolate/separate the latter from the plastic material to be heated, thus further reducing the effectiveness of the heat exchange and making the heating process even less efficient and adequate. Furthermore, the adhesion of the aforementioned undesirable products to the blades of the rotating mixing devices would entail a strong increase in their size and friction, thus greatly increasing the mechanical stress to which they are subjected.

In order to remove tarry (tar) or carbonaceous (char) products from the walls and/or other components of the reactor, periodic maintenance and cleaning of the reactor itself is therefore necessary, in order to prevent sudden blocking. Said scheduled cleaning and maintenance operation is however particularly undesirable as it is a long and laborious operation which requires preliminary shutdown of the reactor, cooling and disassembly. In particular, the cleaning and maintenance operation involves a shutdown that can last even a few days, as it is necessary to first empty the molten plastic inside, wait for it to cool, disassemble one or more parts of the reactor, carry out the maintenance and cleaning operations, and subsequently the procedures for restarting the plant and the reactor must be followed, which also cannot be re-powered before reaching the temperatures necessary for its correct operation.

In order to allow the reactor to be cleaned without having to stop the entire plant, the use of a pair of reactors in parallel has already been envisaged, one of which acts as a backup for the other. In this configuration, a reactor is used until it is necessary to clean it, and therefore to exclude it from the operational operation of the plant, in order to be operationally replaced by the other reactor. This solution clearly does not solve the process problems but defines a management countermeasure—complex but essential—to guarantee operational continuity at the expense of doubling the construction and operating costs of the plant itself.

CN110066667 describes a pyrolysis reactor in which solid state plastics and hot solid bodies (e.g. sand) are introduced into an inlet chamber of the reactor, from which they then fall into a frusto-conical reaction chamber of the reactor which is equipped with a spiral-shaped mixing cochlea. Conveniently, the screw feeds the various products introduced towards the reactor outlet. However, this solution is not fully satisfactory since the mixing between the hot solid bodies and the plastic materials is carried out by means of a rotating mixing means and, therefore, has the drawbacks mentioned above.

U.S. Pat. No. 6,011,187 describes a pyrolysis reactor in which a chamber is provided in which the plastics to be treated in the solid state are mixed with hot sand to be brought to a temperature of about 250-350° C. and thus cause the removal of the chlorine present in the plastics. Subsequently, the compound obtained is mixed, inside a further reaction chamber where the pyrolysis reactions take place, with further sand in order to raise the temperature up to 350-500° C. Subsequently, the resulting sand is cleaned up by an incineration process in the presence of an oxidizer. This solution is not fully satisfactory as it involves heating both the plastic materials and the part of sand that had previously been mixed with the plastic materials during the preliminary phase of chlorine removal inside the reaction chamber, thus entailing a significant increase of energy consumption.

U.S. Pat. No. 6,841,064 describes a reactor for the treatment of petroleum, and not of plastics.

EP0722815 describes a reactor for the decomposition of plastics in which sand and solid-state plastics are introduced into a reactor in order to form a plurality of layers in which the decomposition reactions take place and which also allow the gaseous products to be filtered coming from the lower layers. However, this solution is not fully satisfactory as the reactor is particularly complex to construct and, in particular, its operation requires a large quantity of sand to be introduced into the reactor itself.

OBJECTS OF THE INVENTION

The object of the invention is to propose an apparatus for the treatment of plastic materials which allows to overcome, at least in part, the drawbacks of the known solutions.

Another object of the invention is to propose an apparatus which allows to treat "noble" plastics such as polypropylene (PP), polyethylene (PE) and/or polyethylene terephthalate (PET).

Another object of the invention is to propose an apparatus which allows to treat less noble plastics such as polystyrene (PS) and/or acrylate or methacrylate plastics such as for example polymethylmethacrylate (PMMA).

Another object of the invention is to propose an apparatus which allows to treat plastic materials of any type.

Another object of the invention is to propose an apparatus which allows to treat plastics comprising additives or fillers.

Another object of the invention is to propose an apparatus which allows to reduce energy costs.

Another object of the invention is to propose an apparatus which allows to optimize the thermal load of the reactor through the reuse of process residues.

Another object of the invention is to propose an apparatus which allows to obtain high yields and, at the same time, low conversions into unwanted compounds.

Another object of the invention is to propose an apparatus which allows to obtain reaction products which can be used in the petrochemical industry and/or in the basic chemical industry.

Another object of the invention is to propose an apparatus which allows to obtain diversifiable reaction products according to the requirements.

Another object of the invention is to propose an apparatus which allows to maintain a homogeneous and controlled temperature inside the reactor.

Another object of the invention is to propose an apparatus which allows to control the desired reaction products.

Another object of the invention is to propose an apparatus which allows to control the residence time of the plastic materials inside the reactor.

Another object of the invention is to propose an apparatus which allows to reduce the waste of raw material.

Another object of the invention is to propose an apparatus which is alternative and/or improved with respect to the known solutions.

Another object of the invention is to propose an apparatus which is constructively less complicated to produce than traditional solutions.

Another object of the invention is to propose an apparatus which can be obtained in a simple, rapid way and with low costs.

Another object of the invention is to propose a method for the treatment of plastic materials which can be implemented simply, quickly and with low costs and which also allows a reduction in the energy consumption required for its operation.

Another object of the invention is to propose a method for the treatment of plastic materials which is an alternative and an improvement with respect to traditional solutions.

SUMMARY OF THE INVENTION

All these objects, both individually and in any combination thereof, and others that will result from the following description are achieved, according to the invention, with an apparatus for the treatment of plastic materials having the characteristics indicated in claim 1.

In particular, the apparatus for the treatment of plastics (M), and in particular for the pyrolysis treatment of plastics (M), characterized by the fact of comprising a vertically developing reactor which includes inside:
- a first zone, a second zone and a third zone which are in direct communication with each other, said first zone being vertically superimposed on the second zone and said second zone being vertically superimposed on the third zone,
- an inlet for high temperature particles P, said inlet being arranged so that said particles fall by gravity into said second zone, first crossing said first zone, and also characterized in that it comprises:
- a plurality of nozzles which are mounted in correspondence with said second zone for introducing said plastic materials M in the molten state into said second zone,
- a mechanical mixing device which is positioned and acts inside said third zone.

Conveniently, the apparatus for the treatment of plastics, and in particular for the pyrolysis treatment of plastics, is characterized by the fact that it comprises:
- at least one injection chamber into which the plastic materials to be treated are injected and sand is introduced at a high temperature, to start the pyrolysis reactions,
- a further chamber which is arranged below said injection chamber and which is connected to said injection chamber, to thus receive said sand and reaction intermediates by falling, and also characterized in that a mixing device is provided in said further chamber, to thus mix the sand and reaction intermediates while the pyrolysis reactions continue.

The present invention also relates to a method for the treatment of plastic materials M in which
- the plastic materials M in the molten state are introduced through the nozzles into said second zone of the reactor and, furthermore, through the opening, the high temperature particles P are introduced into the reactor which, after having passed through the first zone, enter said second zone where the heat exchange between the plastic materials M thus introduced into the second zone and the high temperature particles P which reach said second zone causes the pyrolysis reactions of said plastic materials M,
- the reaction products and intermediates in the gaseous and/or vapor state that are formed as a result of the pyrolysis reactions that take place in said second zone rise through the first zone and then exit the reactor through the outlet,
- the particles P with the liquid and solid reaction intermediates, which are formed as a result of the pyrolysis reactions that take place in said second zone, enter said third zone where the pyrolysis reactions of said intermediates are completed while the mixing device acts in so as to prevent clots and packings of what enters said third zone, at the outlet from said third zone thus substantially obtaining particles P, coated with undesirable compounds IR, which then pass into the exit zone in which the transport means make them advance towards the discharge.

DESCRIPTION OF THE FIGURES

The present invention is further clarified hereinafter in some of its preferred embodiments and in some executive variants, reported for purely illustrative and non-limiting purposes with reference to the attached drawing tables, in which.

DETAILED DESCRIPTION OF THE INVENTION AND OF SOME OF ITS PREFERRED EMBODIMENTALS

Figure 1:
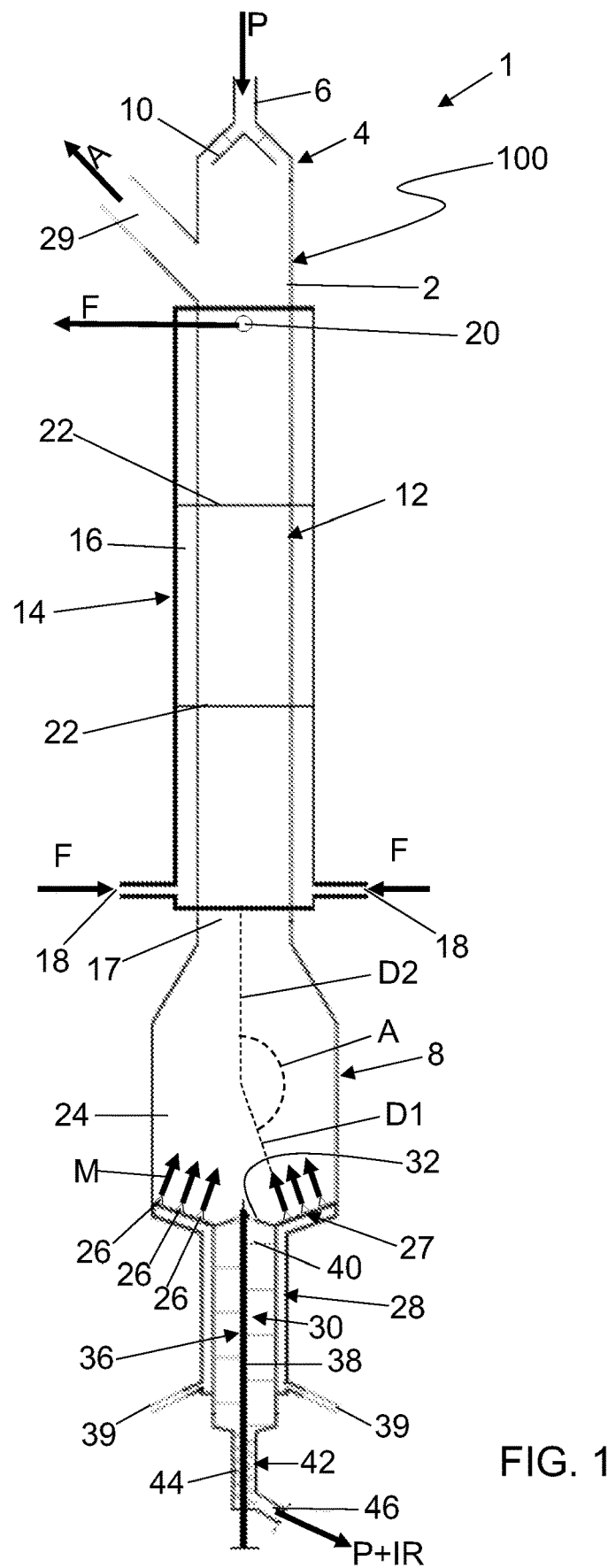
FIG. 1 shows in section of the apparatus according to the invention in a first embodiment.

Hereinafter, "M plastics" means long-chain polymeric materials in the most general sense and substantially all classes of polymers are included, regardless of the chemical composition, homopolymers and copolymers, pure or mixtures thereof. Conveniently, the plastics can comprise organic or inorganic fillers or additives, in any concentration. Preferably, the plastics or plastics to be treated include polyolefins, such as HDPE, LDPE, PP, PS, both alone and mixed together, but they could also be mixed with other materials such as PET, PVC, paper, etc. plastics or polymers to be treated include plastic waste.

Hereinafter, by "P particles" it is meant inert particles P which, preferably, include quartz or silica sand, ceramic spherules or the like. Conveniently, said particles P have an average diameter ranging from 50 microns to a few centimeters, preferably a few millimeters, and a high hardness and heat capacity. Conveniently, said particles can be heated to high temperatures (for example up to about 750-800° C.) without giving rise to coalescence and/or fusion processes and/or without causing chemical reactions. Preferably, the particles P comprise sand and, more preferably, comprise particles P of silica (including any impurities) with a particle size ranging from a few tenths of a millimeter to a few millimeters.

Hereinafter, the term "intermediates" refers to organic compounds—in solid, liquid and/or gaseous state—which derive from pyrolysis and/or thermolysis reactions of plastic materials M and which can therefore undergo further reactions. For example, the intermediates include compounds which have not yet become waxes and/or liquid hydrocarbons and/or gaseous hydrocarbons. For example, the waxes can comprise organic compounds comprising at least about 20 carbon atoms, which are therefore solid at room temperature, and have a melting point of around 40-50° C. Conveniently, waxes can be used in the chemical industry as reagents, or as lubricants in the mechanical industry or for the preparation of paints, cosmetics and ointments. For example, gaseous hydrocarbons can comprise organic compounds comprising from one to four carbon atoms, and which therefore are in the gaseous state at room temperature. Conveniently, gaseous hydrocarbons can be used as fuels or as raw materials for use in the petrochemical or chemical industry. For example, liquid hydrocarbons can comprise organic compounds which have a molecular mass between that of waxes and that of gaseous hydrocarbons, and which therefore occur in the liquid state at room temperature. Conveniently, liquid hydrocarbons can be used as fuels (diesel fuels) or as raw materials for use in the petrochemical or chemical industry.

Hereinafter, the term "reaction products in the gaseous and/or aeriform state" A refers to the products of the pyrolysis and/or thermal cracking reaction of the plastic materials M which are in the gaseous and/or aeriform state.

Hereinafter, the term "undesirable reaction compounds" IR refers to undesirable organic compounds such as TAR, CHAR and/or other undesirable compounds deriving from organic or inorganic fillers or additives contained in the plastics introduced and treated in the reactor. For example, these compounds are characterized by a high molecular mass and low oxidation level or by a solid residue consisting mainly of carbon.

In general, hereinafter, with "pyrolysis" or "thermolysis" or "thermal cracking" we mean the breakdown reactions of chemical bonds within a molecule or a macromolecule, for example of a plastic material, which occur at due to high temperatures. In particular, said processes take place in the absence of oxygen or other oxidizing and/or oxidizing agents, in order to avoid combustion and/or incineration reactions.

As is clear from the figures, the treatment apparatus for plastic materials M, indicated as a whole with the reference number 1, comprises a reactor 100.

Conveniently, the reactor 100 has a prevalent development which is substantially vertical. Conveniently, the reactor 100 is configured to be oriented substantially vertically.

In particular, the reactor 100 comprises a container 2 substantially closed and isolated from the outside, inside which chemical reactions take place pyrolysis of plastics M.

Suitably materials, the reactor 100 includes vertically extending inside a first zone 12, a second zone 24 and a third zone 30 which are in direct communication with each other and which are vertically superimposed, in particular the first zone 12 is vertically superimposed on the second zone 24 and the latter is vertically superimposed on the third zone 30.

Preferably, the first zone 12, the second zone 24 and the third zone 30 are coaxial.

Preferably, the second zone 24 defines an injection chamber since it is the chamber/environment in which the plastic materials M are injected into the reactor 100. Conveniently, the second zone 24 defines the main chamber for the pyrolysis reactions since inside, most of the pyrolysis reactions take place.

Conveniently, the container 2, which substantially defines the reactor 100, comprises an inlet 6 for high temperature particles P and, in particular, for particles P which have been previously heated outside the reactor 100. Conveniently, the inlet 6 for high temperature particles P is positioned above said first zone 12 or near or at the upper end of said first zone 12.

Conveniently, the inlet 6 for the high temperature heated particles P is defined in an upper zone 4 of the container 2 and, in particular, in an area which is superimposed on said first area 12.

Figures 2, 2A:
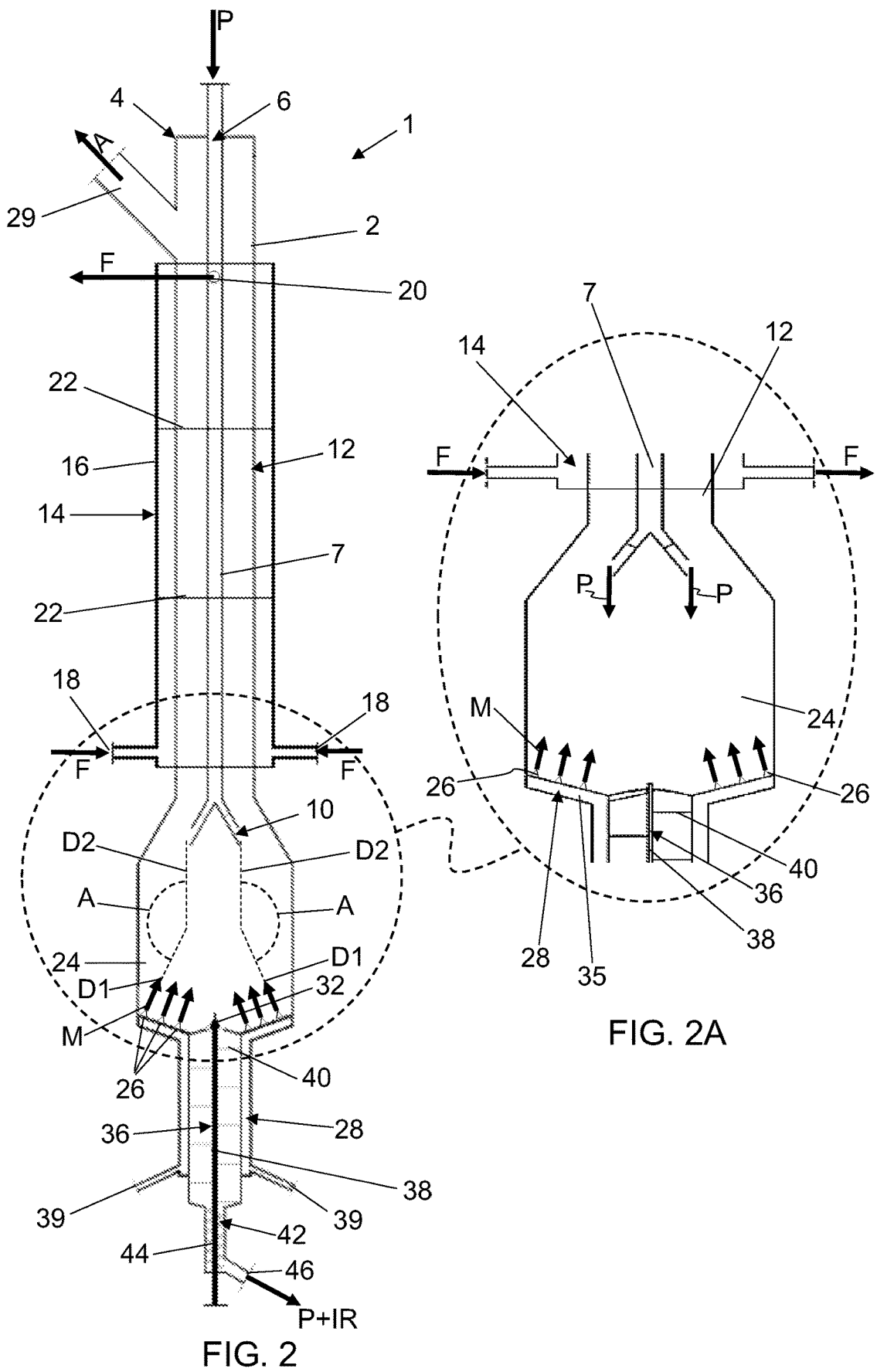
FIG. 2 shows it in a second/further embodiment.
FIG. 2A shows an enlarged detail of FIG. 2.
Figure 3:
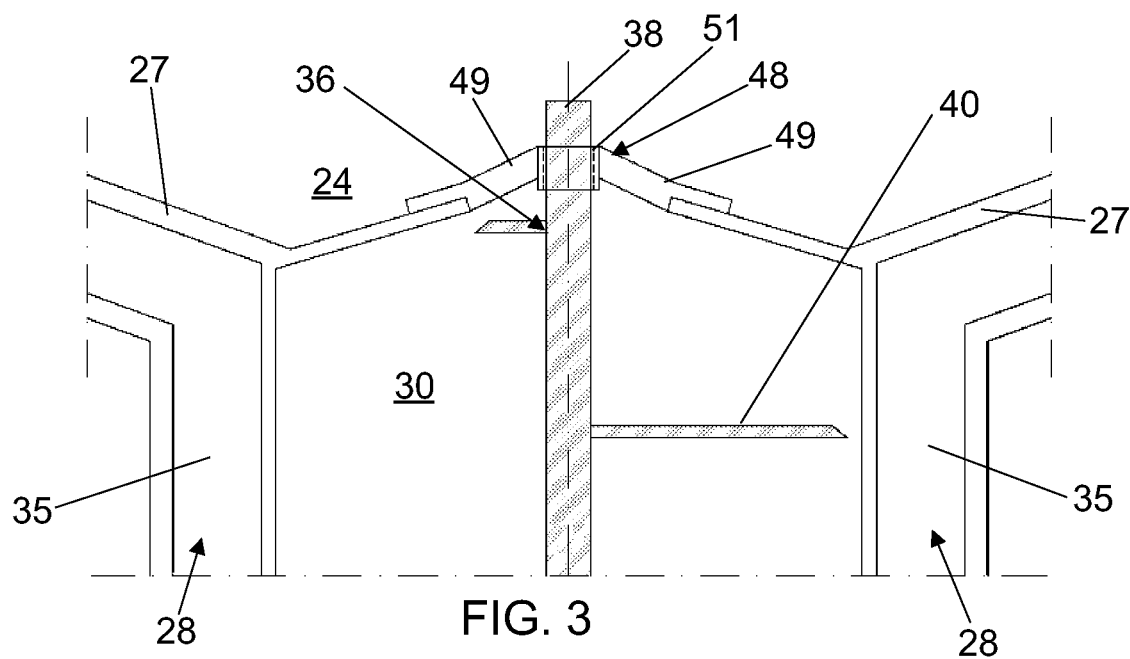
FIG. 3 shows in section an enlarged detail between the second zone and the third zone of the reactor of the apparatus according to the invention.
Figure 4:
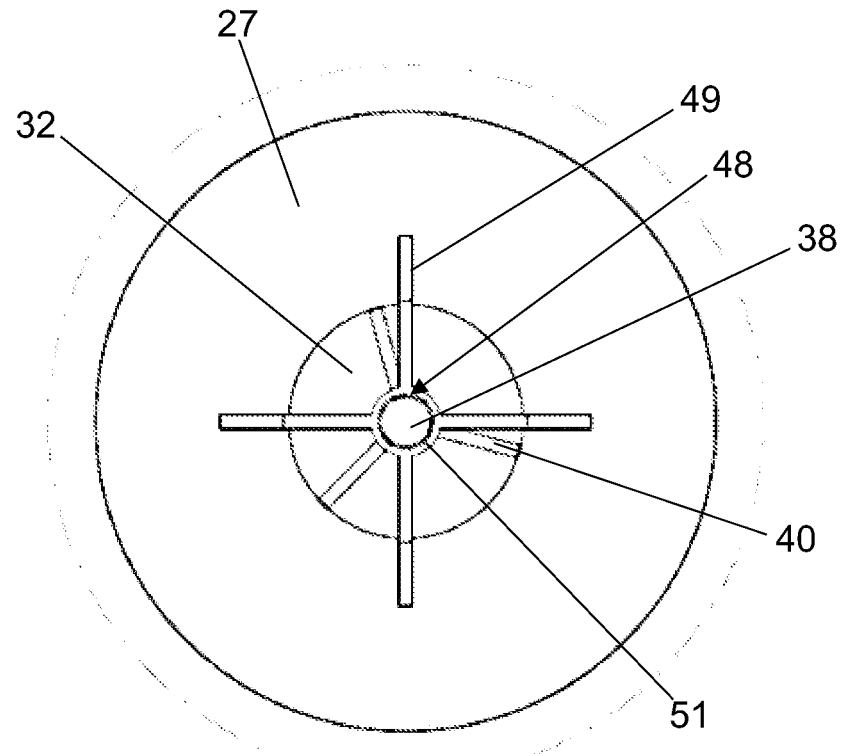
FIG. 4 shows in top view the detail of FIG. 3 in correspondence with the passage between the second zone and the third zone of the reactor of the apparatus according to the invention.
Figure 5:
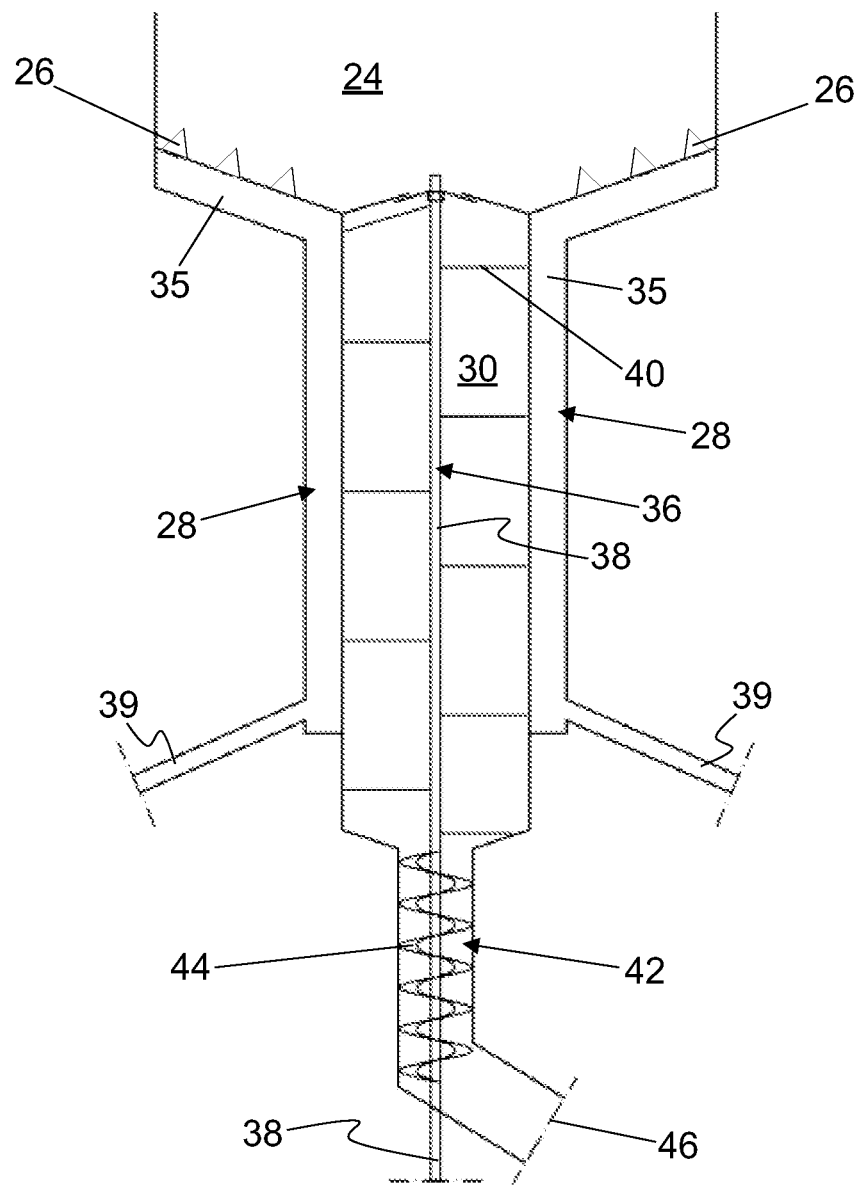
FIG. 5 shows in section a detail of the apparatus according to the invention relating to the bottom of the second zone, to the third zone and to the output area.

Conveniently, the inlet 6 can be directly connected with the first area 12 (see FIG. 1) or it can be connected directly with the second zone 24 through a channel 7 which crosses the first zone 12 (see FIG. 2). Advantageously, the channel 7 crosses internally—and preferably centrally—said first zone 12 and in such a way as to be spaced from the walls of said first zone (12).

Advantageously, the high temperature particles P—and in particular the heated sand particles P—enter the container 2 from the inlet 6. In particular, therefore, the heated particles P pass through the container 2 by gravity—and in particular they fall by gravity along the container 2 until reaching the second zone 24. Advantageously, the high temperature particles P which enter the container 2 have—and are suitably heated in advance and outside the container 2—to a temperature higher than about 700° C., and preferably between about 750/800 and about 900° C.

Conveniently, said container 2 can be substantially watertight, ie there may be no further outlets other than the predefined ones from which gas can exit and/or enter.

In particular, suitably, oxygen is not substantially present inside the container 2 or oxygen may be present in insufficient quantities to allow the initiation of combustion and/or incineration reactions.

Advantageously, in a position substantially facing said inlet 6, and preferably in a lower position than said inlet 6, there may be an element 10 for spreading the particles P 10 which is configured to spread the particles P coming from the inlet 6 in a manner that, during their fall along the container 2, these are distributed in a substantially homogeneous way inside the container itself, in particular within the cross section of the latter. For example, said spreading element 10 can comprise an element of conical or frusto-conical shape, which advantageously can have a plurality of holes (not shown) on its lateral surface, and arranged so that its apex or base the lower ones face the inlet 6.

In a preferred embodiment, such as the one shown in FIG. 2, said inlet 6 for the particles P can be associated with a substantially tubular channel 7, which ends directly inside said second zone 24; suitably, in this case, said element 10 for spreading the particles P can therefore also be positioned inside the second zone 24.

Therefore, suitably, the high-temperature particles P can be introduced into the reactor 100 inside the upper zone 4 and/or the first zone 12 (see FIG. 1), or they can be introduced inside the reactor 100 directly inside the second zone 24 while crossing the first zone 12 inside the channel 7 (see FIG. 2). Basically, the particles P 10 can pass through the first zone 12 inside the environment delimited by the walls of said first zone, or they can pass through the first zone 12 inside the channel 7 which thus keeps said particles P separate from the environment. internally delimited by the walls of said first area.

As said, the container 2 further comprises a first zone 12, preferably shaped like a column. In particular, the first zone 12 is defined by a vertically elongated portion.

The reactor 100 also comprises an outlet 29 for the reaction products A in the gaseous and/or aeriform state which is positioned above said first zone 12 and/or at or near the upper end of said first zone 12.

Conveniently, the first zone 12 has a substantially column-like development with a first extremal portion which is fluidically connected to the outlet 29 for the reaction products A in the gaseous and/or aeriform state while the other extremal portion is connected to said second zone 24. Conveniently, the inlet 6 for the high temperature particles P is also provided in correspondence with said first extremal section.

In particular, the first zone 12 communicates the upper zone 4 of the container 2, in which the entrance 6 of the sand is provided, with the underlying second zone 24.

In a preferred embodiment, around the first zone 12, and in particular outside the latter, there are heating means 14 configured to heat the walls of the first zone 12 of the container 2. Advantageously, said heating means 14 comprise means for indirectly heating the walls of the first zone of the container 2 by means of a heating fluid F which passes through/permeates a heating section 16 which is provided externally and around said first zone 12. Preferably, the heating section 16 involves wholly or mostly the development in height of the first zone 12.

Conveniently, said heating means 14 comprise a heating section 16 defined by a tube bundle, inside which a heated fluid can flow, and/or by a heated jacket, for example with an annular cross-section inside which a heated fluid. Conveniently, the heating section 16 is fluidically connected to at least one inlet port 18 for a hotter fluid and to at least one outlet port 20 for the fluid that has passed through the section 16, thus yielding heat to the walls of the first zone 12. Conveniently, said at least one inlet port 18 and said at least one outlet port 20 are fluidically connected to a heating device (not shown) configured to heat the fluid intended to be inlet and to pass through section 16. Advantageously, section 16 and the heating device are connected fluidically so as to define a closed fluidic circuit, and this in order to reduce the consumption of hot fluid and the corresponding energy.

Conveniently, said heating means 14 are configured so that the heating fluid passes through the heating section 16 in counter-current with respect to the direction of the force of gravity and/or the direction with which the particles P pass through the first zone 12.

Advantageously, said at least one door inlet 18 of the heating fluid can be positioned at a lower height than said at least one outlet port 20, so that the heating fluid passes through the section 16 in a direction opposite to that of the earth's gravitational force. Conveniently, this makes it possible to have (and preferably maintain) a higher temperature in correspondence with the lower portion of the first zone 12 in order to ensure greater heating in the portion of said zone where the heat requirement is greater. Advantageously, said heating fluid can comprise a liquid (for example water or diathermic oil) or a gas (for example air, inertized air or exhaust air), or a vapor (for example water vapor), or in general other fluids suitable for acting from thermal vectors.

Conveniently, at different heights along the longitudinal development of the heating section 16, fluid equalization rings 22 can be provided which, preferably, consist of perforated plates, suitably shaped, which allow to equalize the flow of the fluid and its temperature along the heating section 16.

Advantageously, by means of the heating means 14, it is possible to have and/or maintain the temperature inside the first zone 12 between about 400° C. and about 600° C., and preferably between about 500° C. and about 550° C.

Conveniently, in the embodiment of FIG. 2, the channel 7 defines a closed channel which internally crosses the first zone 12 of the container 2 and is fluidically separated from the internal environment of said zone. Advantageously, said channel 7 can be made of material which allows indirect heat exchange between the particles P flowing inside the channel itself and the intermediates and/or reaction products that are present in and/or pass through the first zone 12.

Preferably, the completion of the chemical pyrolysis reactions for the intermediates in the form of gas or vapor takes place in said first zone 12. More in detail, in said first zone 12—thanks to the heating means 14 and to the fact that the high temperature particles P pass through said first zone 12—the pyrolysis reactions continue on the reaction products and/or intermediates in the gaseous and/or aeriform and deriving from the pyrolysis reactions which take place inside the second zone 24.

As said, below said first zone 12, the apparatus 1 comprises said second zone 24. Advantageously, said second zone 24 can have a cross section with a greater radial development than that of the first zone 12, thus substantially giving the container 2 the shape of a flask.

Conveniently, the second zone 24 is in direct connection with the first zone 12 and, in particular, no bottleneck or constriction is provided in the connecting section between said two zones.

Conveniently, inside said second zone 24 a plurality of nozzles 26 are mounted and/or housed for introducing the plastics M to be treated in the molten state inside said second zone 24. Therefore, the plastics M and the high temperature particles P initially come into contact within the second zone 24.

Conveniently, within the second zone 24, the plastics M which are introduced in the molten state inside said second zone come into direct contact with the high temperature particles P, thus triggering the pyrolysis reactions (thermal cracking) of said plastic materials M. Conveniently, while the reaction products or intermediates in the gaseous and/or vapor state then rise towards the first zone 12, the intermediates reaction in the liquid and/or solid state—together with the particles—descend towards the underlying third zone 30. In particular, therefore, the plastic materials M come into contact with the particles P when the latter are already at a temperature equal to or higher than that necessary to activate the pyrolysis reactions.

Preferably, the second zone 24 has a bottom 27 having a substantially truncated cone shape. Preferably, the nozzles 26 are mounted on said bottom 27 of the second zone 24.

Conveniently, the plastics M to be treated in the molten state are introduced into said second zone 24 through the nozzles 26, while the high temperature particles P are introduced into said second zone 24 through at least one inlet 17 which is in communication with inlet 6 through the first zone 12 (and suitably through the upper zone 4) or through the channel 7. Therefore, the plastic materials M and particles P enter the second zone 24 through different entrances.

Conveniently, said plurality of nozzles 26 are mounted and/or positioned inside the second zone 24 so as to be oriented in one direction, a slightly angled direction and/or in the opposite direction with respect to the direction of the force of gravity and, in particular, with respect to the direction of entry of the particles P into said second zone 24.

Conveniently, said plurality of nozzles 26 are mounted and/or positioned inside the second zone 24 so that, inside the latter, the spray of plastic materials M to be treated in the molten state is substantially in counterflow with respect to the direction in which the particles P enter and pass through said second zone 24.

Conveniently, said plurality of nozzles 26 are mounted and/or positioned inside the second zone 24 so that, inside the latter, the spray of plastic materials M to be treated in the molten state is substantially angled or in the opposite direction with respect to the direction of the force of gravity and/or with respect to the direction in which the particles P pass through said second zone 24.

Conveniently, said plurality of nozzles 26 are mounted and/or positioned inside the second zone 24 so that the axis D1 which it emerges from the outlet hole of said nozzles intersecting the falling direction D2 of the particles P inside said second zone defining an angle A of about 90-180°, preferably greater than 150°.

Preferably, said plurality of nozzles 26 are mounted and/or positioned inside the second zone 24 so as to be at least partially facing the inlet mouth 17 of the particles P inside said second zone 24

In a preferred embodiment, on the lower surface of said second zone 24 can be mounted a plurality of nozzles 26 configured to spray the plastic materials M in the molten state inside the second zone 24. Advantageously, the lower surface of said second zone 24 can be inclined with respect to the horizontal, and in particular forming an acute angle with the horizontal, so as to define that the nozzles 26 which are mounted on said surface point substantially towards the center of the second zone 24. In particular, the nozzles 26 can be positioned according to any arrangement and advantageously they can have an outlet hole with a diameter ranging from the fraction of a millimeter up to and to a diameter of the order of centimeters.

Advantageously, said nozzles 26 can be fluidically connected to a circuit 28 for feeding the plastics M in the molten state. Conveniently, said supply circuit 28 can be provided with heating elements 33, for example heating plates, configured to carry and/or maintain said plastics M to be treated in the molten state, and preferably to heat them to a temperature at which their viscosity is such as to allow the creation of a turbulent flow out of the nozzles 26. Advantageously, the heating elements 33 allow the plastic materials M to be kept in the fluid state inside the circuit 28 and also act as a support during the operation phase of the reactor 100.

Preferably, the supply circuit 28 comprises a chamber 35 provided below the frusto-conical bottom 27 of the second zone 24 and—preferably—also around the walls which internally delimit the third zone 30. Preferably, the chamber 35 develops—at least in part—around the third zone 30. Conveniently, the nozzles 26 are in fluid communication with the interior of the chamber 35. Conveniently, the chamber 35 is provided with corresponding inlet conduits 39 for the plastic materials M—preferably already in the molten or semi-melted state—inside the chamber itself. Conveniently, the heating elements 33 are associated with the walls of the chamber 35.

Advantageously, the plastics M in the molten state can be sent under pressure—in particular at high pressure—towards the nozzles 26, and this in order to increase the flow rate of the molten plastic and improve the turbulence and mixing conditions inside the second zone 24 and, in particular, in order to achieve an effective heat exchange between the particles P and the plastic materials M and to make the temperature uniform. Preferably, the temperature of the molten plastic is about 200° C.-450° C. and the pressure is preferably higher than 2 bar. Conveniently, the plastic materials M are introduced into the second zone 24 at high pressure and, in particular, they can be injected at a pressure higher than about 2 bar and lower than about 12 bar. In a preferred embodiment, the plastics M in the molten state can be injected, through the nozzles 26, into the second zone 24 at a pressure of about 4-5 bar. Advantageously, this allows to obtain an optimal throw and/or flow in order to obtain the required mixing effects. In particular, the plastics M in the molten state which emerge from the nozzles 26 can be injected into the second zone 24 so as to form a jet or spray of liquid. Conveniently, this jet may not comprise a significant amount of air bubbles, and preferably may not be in the form of an aerosol and/or nebulized spray.

Advantageously, the supply circuit 28 of the plastic materials M can comprise a unit for removing the chlorine from the plastic materials M themselves (not shown). In particular, said unit can provide an outlet duct for the chlorine-based gases that can be formed following the heating of materials including chlorine (such as PVC, PCTFE or other materials that include chlorine as an impurity), suitably connected or provided with filters. Furthermore, said unit can comprise a device configured to add calcium-containing materials in order to promote suitable chemical reactions suitable for the sequestration of chlorine.

Figure 6:
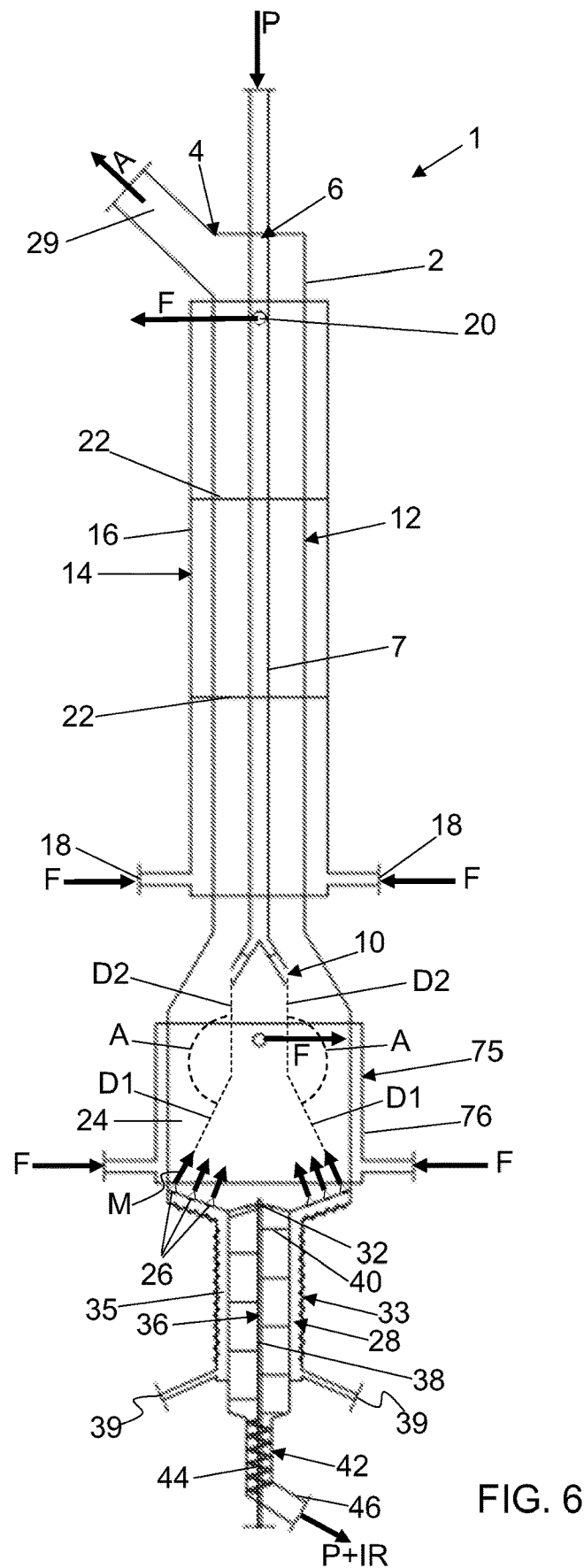
FIG. 6 shows in section the apparatus according to the invention in a third embodiment.
Figure 7:
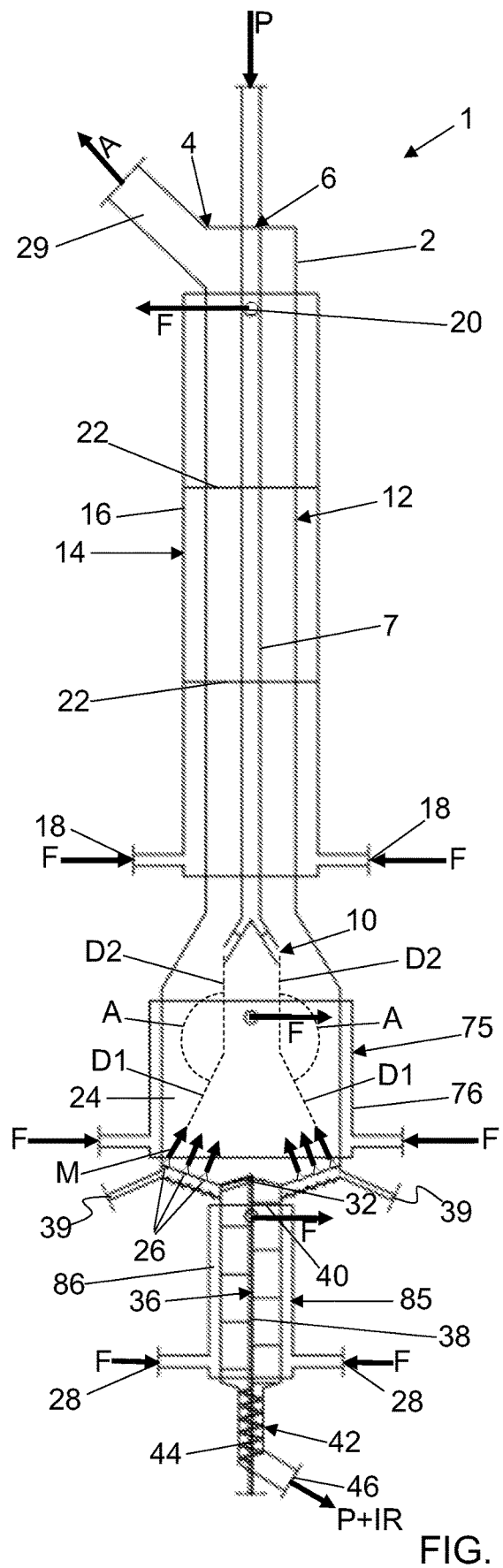
FIG. 7 shows in section the apparatus according to the invention in a fourth embodiment.
Figure 8:
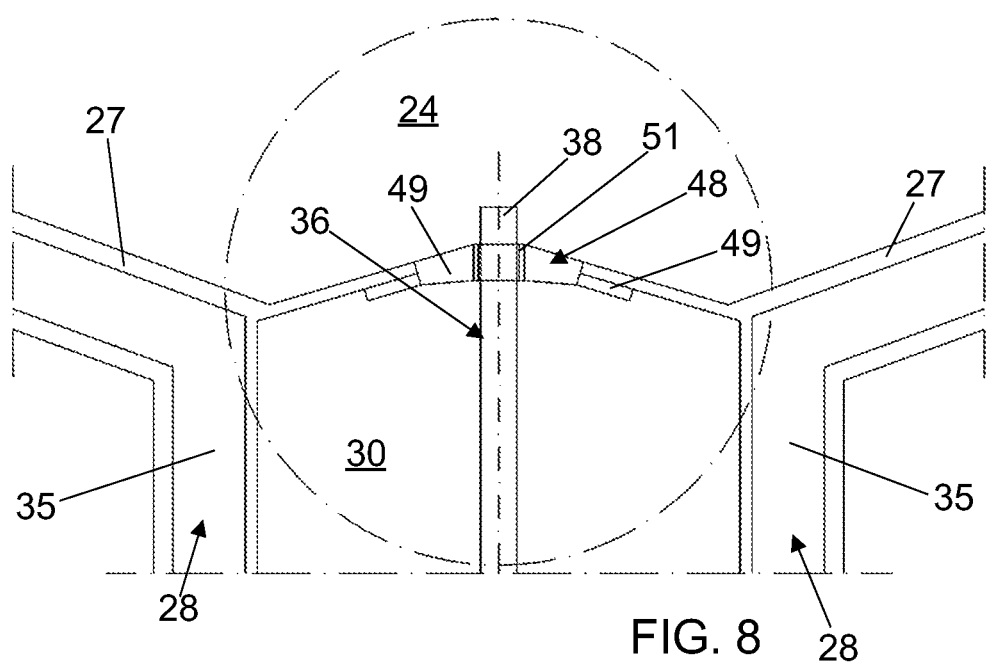
FIG. 8 shows in section a variant of the same enlarged detail of FIG. 3.
Figure 9:
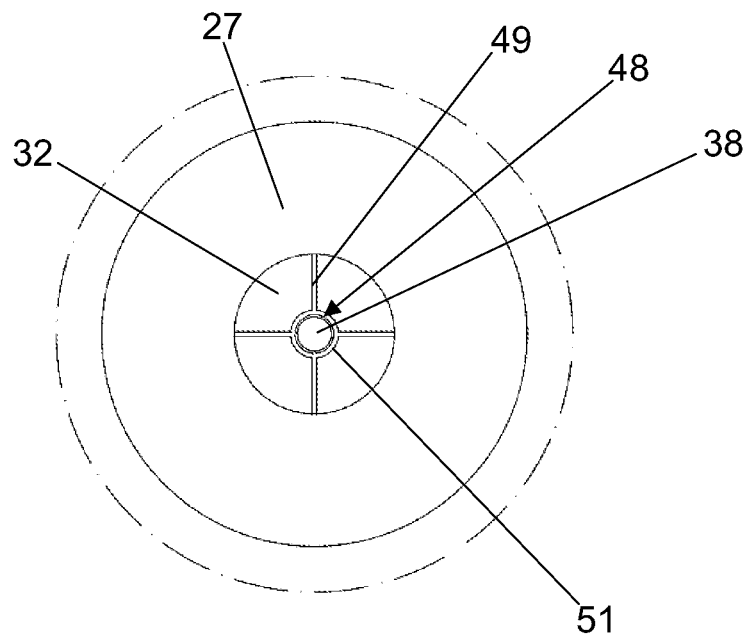
FIG. 9 shows a top view of the detail of FIG. 8.

Advantageously, in some possible embodiments (see FIGS. 6 and 7), around the second zone 24, and in particular outside the latter, second heating means 75 configured to heat the walls of the second zone of the container 2 can be provided 24. Advantageously, said second heating means 75 comprise means for indirect heating of the walls of the second zone 24 of the container 2 by means of a heating fluid F which passes through/permeates a second heating section 76 which is provided externally and around said first zone 12. Preferably, the second heating section 76 covers all or most of the height extension of the second zone 24. Conveniently, said second heating means 75 are configured so that the heating fluid F passes through the second heating section 76 in counter-current with respect to the direction of the force of gravity and/or the direction in which the particles P attr pour into the second zone 24. Conveniently, the second heating means 75 can be of a type corresponding to that described above in more detail for the heating means 14.

Conveniently, the reactor 1 comprises an outlet 29 for the reaction products A in the gaseous and/or aeriform state. Conveniently, the outlet 29 is in fluid communication with the first zone 12. Conveniently, said outlet 29 is provided in correspondence with said upper zone 4 and/or said first zone 12. Conveniently, the outlet 29 comprises a duct for configured to convey products A to suitable storage and/or further processing points. Conveniently, the outlet 29 for the reaction products A in the gaseous and/or aeriform state can be connected to a filter system in order to remove any unwanted products leaving the apparatus 1.

Conveniently, within the upper zone 4 there are no mechanical mixing means.

Conveniently, inside the first zone 12 there are no mechanical mixing means.

Conveniently, inside the second zone 24 there are no mechanical mixing means.

Conveniently, the reactor 100 comprises a third zone 30 which is connected with said second zone 24. Preferably, said third zone 30 is positioned below said second zone 24 and, therefore, the three zones 12, 24 and 30 are vertically superimposed.

Preferably, the second zone 24 is in communication with said third zone 30 by means of at least one passage 32 which is preferably defined by a hole formed at the bottom of the second zone 24. Preferably, said second zone 24 and said third zone 30 are always in communication between them. Preferably, said third zone 30 defines a zone for completing the pyrolysis reactions of the plastic residue and is configured to remove any plastic waste and/or reaction residues that have remained glued to the sand—as will become clear later—and to allow for the advancement. of pyrolysis reactions.

Advantageously, said third zone 30 is connected inferiorly to said second zone 24 in order to thus allow particles P and reaction intermediates in the liquid and/or solid state which, among others, can also include undesired IR compounds, such as for example TAR and CHAR to fall. In particular, said third zone 30 can be fluidically connected to the second zone 24 through the passage 32. Advantageously, said third zone 30 is positioned below, preferably immediately below, the nozzles 26 for the injection of the plastic materials M in said second zone 24.

Advantageously, said third zone 30 can have smaller volume and dimensions—in particular in terms of the radial development of its cross section—than the second zone 24.

Inside said third zone 30 substantially further cleaning of the particles P. In particular, the particles P arriving inside said third zone 30 can be coated/covered with intermediates comprising both not completely pyrolyzed compounds, such as for example long-chain polymeric or organic compounds, and unwanted IR compounds deriving from residues of the pyrolysis reaction, such as for example carbonaceous compounds such as TAR and CHAR, or other impurities. Conveniently, the intermediates entering said third zone 30—and in particular the compounds not yet completely pyrolyzed—are reacted further inside said third zone 30 in order to thus obtain particles P coated only with undesirable IR compounds (which do not have been pyrolyzed or have been partially pyrolyzed) and impurities, thus allowing to increase the yield of the reactor 100. Basically, within said third zone 30, the particles P are further cleaned of the reaction intermediates in the liquid and solid state which enter said third zone, thus allowing the pyrolysis reactions to continue and complete in the latter. Conveniently, therefore, at the exit from the third zone 30—in particular on the bottom of the latter—there are substantially particles P coated with undesirable compounds IR.

Advantageously, even inside said third zone 30 there is no oxygen or other oxidizing agents.

Advantageously, also said third zone 30 can have a substantially vertical development.

Furthermore, said third zone 30 can comprise—and in particular house inside it—at least one mechanical mixing device 36. Preferably, said mechanical mixing device 36 is configured to keep the particles P, coated by the intermediates, which enter the inside of said third zone 30, so as to prevent coagulation and packing thereof and—advantageously—so as to also keep the temperature homogeneous. Advantageously, the mixing device 36 can comprise an agitator, in particular a reel, comprising a shaft 38 from which radially protrude a plurality of blades (transverse) 40, preferably suitably shaped, and spaced along the longitudinal development of the shaft itself. Conveniently, the blades 40 can all have substantially the same radial development. Conveniently, at least the blades 40 which act in correspondence with the passage 32 can be suitably shaped—and for example their length and/or shape can be suitably defined—in order to prevent the occlusion of the passage 32. Advantageously, the shaft 38 can be rotatably fixed at both ends and rotated around its longitudinal axis by a suitable actuator. In particular, the shaft 38 can be rotatably supported, in correspondence with the passage 32, by means of a suitable support member 48. Preferably, the support member 48 is configured not to obstruct the passage 32 and, for example, can comprise a hub 51 with a plurality of arms 49 extending radially outwards to engage in an area surrounding the passage 32 obtained on the bottom 27 of the second area 24. Conveniently, the shaft 38 can be associated with a suitable member (not shown) for centering the shaft itself inside said third zone 30.

Advantageously, in an embodiment not shown, the shaft 38 can be suitably lubricated, in order to facilitate its rotation. This can for example be achieved by spraying or injecting plastic materials M in the molten state at the shaft itself, for example by means of further nozzles (not shown), preferably at the rotatable support member 48 of said shaft.

Advantageously, in some possible embodiments (see FIG. 7), third heating means 85 are provided around the third zone 30, and in particular outside the latter, configured to heat the walls of the third zone 30 of the container 2. Advantageously, said third heating means 85 comprise means for indirect heating of the walls of the third zone 30 of the container 2 by means of a heating fluid F which passes through/permeates a third heating section 86 which is provided externally and around said third zone 30 Preferably, the third heating section 86 covers all or most of the extension in height of the third zone 30. Conveniently, said third heating means 85 are configured so that the heating fluid F passes through the third heating section 86 countercurrent with respect to the direction of the force of gravity and/or the direction in which the particles P pass through the third zone 30. Advantageously the third heating means 85 can be of a type corresponding to that described above in more detail for the heating means 14.

Conveniently, the second heating means 75 and/or the third heating means 85 are useful in the transient phase, in particular at the moment switching on and off of the reactor 100.

Conveniently, the third zone 30 can be directly connected at the bottom with an outlet zone 42 (which conveniently defines an expulsion zone), which allows to remove the particles P coated with undesirable compounds IR from said third zone 30, and therefore from the apparatus 1. In particular, said third zone and said outlet zone 42 can be connected by a radial narrowing positioned below said third zone 30 and which defines a passage section between said third zone 30 and said outlet area 42. Conveniently, the third area 30 comprises a truncated cone bottom which opens below towards the area of outlet 42, in order to facilitate the passage of the particles P coated with IR undesirable compounds towards the latter.

Advantageously, transport means 44—preferably comprising a cochlea or a worm screw—configured to advance the particles P coated with undesirable compounds can be advantageously provided inside said outlet area 42, which is also preferably substantially vertical. IR towards a drain 46 (for example defined by a duct).

Advantageously, the transport means 44 are integral in rotation with the mixing device 36. Preferably, the transport means 44 and the mixing device 36 are coaxial and vertically superimposed. Preferably, the same rotating shaft 38 of the mixing device 36 extends inside the outlet area 42 to also act as a rotating shaft for the worm screw of the transport means 44. Conveniently, the same shaft 38 centrally crosses both the third zone 30 and the exit zone 42.

Conveniently, the particles P coated with undesirable compounds IR leaving the exhaust 46—after having been suitably treated—can be sent back to the inlet 6 of the reactor 100 to be re-introduced and reused within the latter. Advantageously, particles P coated with undesirable compounds IR leaving the exhaust 46, which—as mentioned—can still be at least partially coated with carbon residues such as TAR and/or CHAR or other impurities, can be recovered by sending the particles P thus coated, at the outlet from the discharge port 46, to a combustion unit of the carbon residues and/or to a treatment unit of the impurities deposited on the surface of the particles P themselves, to be then redirected at the desired temperature towards the inlet 6 below form of regenerated particles P.

Conveniently, the reactor 100—within which the various zones are defined—has a substantially vertical development and, in particular, the inlet zone 6, the first zone 12, the second zone 24, the third zone 30 and the outlet zone 42 are vertically overlapping and—preferably—are coaxial.

The operation of the apparatus 1 according to the invention is clearly evident from what has been said above, and provides for a step of introducing said plastic materials M in the molten state inside the second zone 24 and a mixing step inside said second zone 24 of said plastic materials M in the molten state with particles P heated to a temperature sufficient to trigger pyrolysis reactions of said plastic materials M. Conveniently, the heated particles P are introduced into said second zone 24 from a substantially opposite direction and/or a different direction, in particular defining an angle greater than 90° and preferably greater than 135°, with respect to the direction of introduction of the plastics M into said second zone 24. Preferably, the plastics M in the molten state they are introduced into the second zone 24 in counterflow with respect to the inlet of the heated particles P into said second zone a 24.

In particular, the particles P (for example the sand granules) are heated—due to the combustion of the carbon residues present on their surface—beforehand and outside the reactor 100 to a suitable temperature, preferably above 700° C., and more preferably between about 800° C. and about 900° C., and subsequently they are introduced into the container 2 of the reactor 100 through the inlet 6. Conveniently a part of the heat obtained from said combustion process can be used to melt the plastic materials M.

Conveniently, the particles P are scattered by the spreading element 10, so as to distribute themselves in a substantially homogeneous manner during the fall through the first zone 12. Alternatively, in the embodiment illustrated in FIG. 2, the particles P can travel the channel 7 until it comes out directly in the second zone 24.

As mentioned, the plastic materials M—that were previously melted and suitably brought to high pressure, and from which any chlorine-based impurities have been removed—are sprayed and introduced in the molten state inside the second zone 24 through the nozzles 26. Advantageously thanks to the high pressure (approximately 2-12 bar, preferably about 4-5 bar), due to the viscosity of the plastic material and to the use of nozzles of adequate size and number, the flow that is established inside the second zone 24 is of the turbulent type. This allows to mix the plastic materials M with the high temperature particles P which enter the second zone 24 without the use of a mechanical mixer, and thus to achieve a high and effective heat exchange with the high temperature particles P, keeping the temperature.

In particular, the heated particles P which, by falling, enter the second zone 24 exchange heat with the plastics M introduced in the molten state through the nozzles 26, and this in order to bring the temperature of the mixture that forms to the inside the zone itself above 400° C. and preferably at a temperature of about 500-550° C. In this way it is possible to carry out the thermal cracking and/or pyrolysis reactions in the optimal conditions for yield, which allow to transform the macromolecules that make up the plastic materials M into shorter molecules, and in particular into waxes, liquid hydrocarbons and gaseous hydrocarbons.

The heated particles P passing through the first zone 12 exchange heat with the intermediates and/or products, in gaseous and/or vapor form, of the pyrolysis reactions that take place inside the second zone 24. In particular, in the embodiment of FIG. 1 the particles P exchange heat directly with the intermediates and/or reaction products in gaseous and/or aeriform state which rise through the first zone 12. In particular, in the embodiment illustrated in FIG. 2, the particles P exchange heat indirectly, through the walls of channel 7, with the intermediates and/or products of the pyrolysis reactions that rise through the first zone 12.

Basically, the reaction products and/or intermediates, which are formed in the second zone 24 and which at the reaction temperature are in the gaseous state, then rise along the first zone 12 where the pyrolysis reaction continues due to the heating means 14 and also of the o heat exchange (direct or through the walls of channel 7) with the high temperature particles P which, entering from inlet 6, fall through the first zone 12 towards the second zone 24. In particular, in fact, the pyrolysis reactions are endothermic reactions, and therefore, if it is necessary to make them continue, it is necessary to continue to supply heat to the reactants and intermediates that pass through the first zone 12. This occurs—in correspondence with the first zone 12—thanks to the heating means 14 and the heat exchange that can be direct with the falling particles P and/or indirect with the walls of the channel 7 heated by the falling particles P passing through said channel. Advantageously, this allows to reduce the amount of intermediates and products that are too heavy to be used, and thus obtain a higher conversion and a greater yield in desired products.

Advantageously, therefore, on the basis of the process temperature and the residence time of the products inside the second zone 24 and/or the first reaction zone 12, it is possible to control the relative quantities of waxes, liquid hydrocarbons and gaseous hydrocarbons which, suitably, constitute three desired types of reaction products.

During the reactor operation, a part of the particles P and of the intermediates in the liquid and solid state which are formed inside the second zone 24 fall by gravity—through the passage 32—inside said third zone 30. In particular, inside said third zone 30, particles P enter coated by intermediates comprising not completely pyrolyzed compounds, such as polymeric compounds or long chain organic compounds, and/or by undesired compounds and residues of the pyrolysis reaction, for example TAR and CHAR.

Inside said third zone 30 the pyrolysis reactions of the compounds still not completely pyrolyzed continue and, at the same time, the particles P coated with the intermediates in the liquid and/or solid state are suitably and continuously stirred by the action of the mixing device 36. In particular, this allows to avoid clots and packings which would cause the blocking of the apparatus 1. Conveniently, the presence of the mixing device 30 inside the third zone 30 is particularly advantageous since inside said third zone 30 for the most part partially coagulated particles P enter due to the presence of partially pyrolyzed intermediates and tarry and carbonaceous residues, which are sticky and which—if not remixed—could create compresses capable of undesirably blocking the functioning of the apparatus 1 and, in particular, the outflow from said third zone 30.

Furthermore, since the third zone 30 passes kept at a high temperature, the pyrolysis reactions continue, going further to pyrolyze the intermediate compounds present within the area itself. This allows to improve the reaction products, and in particular to make them "cleaner", and also helps reduce the risk of packing.

In particular, therefore, said third zone 30 prevents the packing of particles, reactants, reaction intermediates and residues and, moreover, within said third zone 30 the advancement of the pyrolysis reactions for compounds which are not completely pyrolyzed yet.

Then, from said third zone 30, the particles P coated with the undesirable compounds IR (such as carbonaceous compounds, for example TAR and CHAR, or other impurities deriving from non-pyrolyzable fillers and/or additives present inside the treated plastic materials M) descend inside the outlet area 42 where the transport means 44 push them towards the discharge door 46 and, advantageously, then enter a circuit for regenerating, heating and recovering the particles P.

Advantageously, since the passage 32 between the second zone 24 and said third zone 30 does not provide for any type of interruption or closure, the residence time of the particles P and of the plastic materials M inside the reaction environment defined by the second zone 24, by said third zone 30 and by first zone 12—is substantially controlled by the speed of advancement of said transport means 44.

Advantageously, thus controlling the movement of the transport means 44—which, as mentioned, it influences the residence time of the plastic materials M inside the reaction environment—the temperature in the second zone 24 and in said third zone 30 can be controlled and the selectivity of the cracking reactions can also be controlled and therefore varied the respective proportions of waxes, liquid hydrocarbons or gaseous hydrocarbons which are produced during the reaction.

Preferably, the plastics M to be mixed with the particles P are introduced in the molten state inside the second zone 24.

Advantageously, the plastics M in the molten state are introduced into said second zone 24 through nozzles 26 at a pressure comprised of about 2-12 bar, preferably of about 4-5 bar.

Preferably, the plastic materials M are introduced in the molten state inside the reactor 100, and in particular inside the second zone 24, so as to generate a turbulent flow inside said second zone.

Advantageously, said step of introducing the plastic materials M into the reactor 100 provides that said plastic materials M are injected into said second zone 24 so as not to generate a spray and/or an aerosol.

Advantageously, before being introduced into the reactor 100, said plastic materials M are subjected to a step of removing chlorine-based compounds and/or impurities.

Conveniently, the residence time of said particles P inside the container 2 of said reactor 100 is determined by the actuation of transport means 44, for example a cochlea or a worm, configured to allow the exit from said container of the particles P coated with IR undesirable compounds.

Advantageously, most of the pyrolysis reactions take place in said second zone 24 into which the plastic materials M are introduced, while a further part of pyrolysis reactions takes place in a third zone 30.

In a preferred embodiment, the reaction intermediates in the liquid and/or solid state and the particles P, which enter inside said third zone 30, are mixed by at least one mechanical mixing device 36. Preferably, said at least one mechanical mixing device 36 is lubricated by direct spraying of molten M plastics.

Conveniently, the apparatus 1 is configured to convert the plastic materials M, which are introduced into it in the molten state, into basic organic chemistry products, such as waxes, liquid hydrocarbons and gaseous hydrocarbons, and into carbon residues linked to the particles P placed inside the reactor itself.

Conveniently, in the reactor 100 the mixing of the plastic materials M, the uniformity of the temperature and of the composition are obtained by introducing said plastic materials in the molten state into the second zone 24 through the nozzles 26, while reaching the appropriate temperature for the reactions of pyrolysis is obtained from the interaction with the high temperature particles P which enter the second zone 24 in counterflow with respect to the plastic materials emerging from said nozzles.

From what has been said it is clear that the apparatus according to the invention is particularly advantageous as it allows:
- to treat plastics of any type, thus not requiring separation and/or rejection processes at the entrance,
- to control the type of products of the pyrolysis reactions, thus allowing high flexibility according to market demands,
- to obtain high yields thanks to the temperature control and the absence of thermal gradients inside the reactor, in particular in correspondence with the injection zone of the molten plastic,
- to heat the mass in reaction in a simple, effective, stable and homogeneous way thanks to the turbulence triggered and maintained in the injection zone of the molten plastic, thus allowing a rapid heat exchange and not requiring continuous cleaning and maintenance operations,
- a homogeneous temperature distribution thanks to the turbulence triggered and maintained in the injection zone of the molten plastic,
- to define three distinct reaction zones (respectively the first zone 12, the second zone 24 and the third zone 30), each differentiated and specialized according to the reaction needs and purposes,
- to intervene on the operating parameters quickly and effectively by varying the flow rate and/or temperature of the particles P and/or the heating fluid of the media 14 and/or the flow rate of the plastic materials M fed, with very fast system response times,
- to increase plant availability and greatly reduce the need for plant shutdowns due to maintenance operations for cleaning,
- to preserve the reactor walls from char and tar encrustations thanks to the abrasive action of the particles P continuously mixed and moved,
- to reduce the need for external energy thanks to the self-generation of heat by using the residues as a heat source for the reactor,
- to drastically reduce the amount of waste produced which, in particular, is limited to the ashes deriving from the combustion of residues.

The invention claimed is:

1. An apparatus (1) for the pyrolysis treatment of plastics (M), comprising a vertically developing reactor (100) which comprises:
   a first zone (12), a second zone (24) and a third zone (30) which are in direct communication with each other, said first zone (12) being vertically superimposed on the second zone (24) and said second zone (24) being vertically superimposed on the third zone (30),
   an inlet (6) for high temperature particles (P), said inlet (6) being arranged so that said particles (P) fall by gravity into said second zone (24) first passing through said first zone (12),
   a plurality of nozzles (26) which are mounted in correspondence with said second zone (24) for introducing said plastics (M) in a molten state into said second zone (24),
   a mechanical mixing device (36) which is positioned and acts inside said third zone (30), and
   a channel (7) for bringing said particles at high temperature (P) into said second zone (24), said channel (7) being closed, crossing said first zone (12) and having a first end which is connected with the inlet (6) for the high temperature particles (P) while the other end is connected with the second zone (24).

2. The apparatus according to claim 1, wherein:
   in said at least a second zone (24) the plastic materials (M) to be treated are injected and said particles (P) also enter at high temperature, to thus start the pyrolysis reactions,
   said third zone (34) is arranged inferiorly to said second zone (24) and which is connected with said second zone (24), to thus receive by fall said particles (P) and reaction intermediates,
   said mixing device (36) is configured to thus mix the particles (P) and the reaction intermediates while the pyrolysis reactions continue.

3. The apparatus according to claim 1, wherein said inlet (6) for the high temperature particles (P) is positioned above said first zone (12) or near or at the upper end of said first zone (12).

4. The apparatus according to claim 1, wherein said third zone (34) is positioned below the nozzles (26) for the injection of plastic materials in said second zone (24).

5. The apparatus according to claim 1, wherein said plurality of nozzles (26) for introducing molten plastics (M) into the second zone (24) and said opening for inlet (6) of said particles (P) at high temperature are configured so that the flow of said particles (P) is substantially in counterflow with respect to the flow of said plastic materials (M) introduced into the second zone (24).

6. The apparatus according to claim 1, wherein the nozzles (26) are mounted on a bottom (27) of the second zone (24).

7. The apparatus according to claim 1, wherein said plurality of nozzles (26) are mounted and/or positioned inside the second zone (24) so as to be oriented in an angled direction and/or in the opposite direction with respect to the direction of the force of gravity and with respect to the direction of entry of the particles (P) into said second zone (24).

8. The apparatus according to claim 1, wherein no mechanical mixing device is provided inside said second zone (24) and/or inside said first zone (12).

9. The apparatus according to claim 1, wherein said nozzles (26) are fluidically connected to a supply circuit (28) for the plastics (M) in the molten state.

10. The apparatus according to claim 9, wherein said nozzles (26) and/or said supply circuit (28) are configured to introduce the plastics (M) in the molten state into said second zone (24) at a pressure of about 2-10 bar.

11. The apparatus according to claim 1, wherein said first zone (12), provided above said second zone (24), is configured to continue the pyrolysis reactions on the products and/or intermediates in the gaseous state deriving from the pyrolysis reactions that take place inside the second zone (24).

12. The apparatus according to claim 1, further comprising an outlet (29) for the reaction products (A) in the gaseous and/or aeriform state which is positioned above said first zone (12) and/or at or near the upper end of said first zone (12).

13. The apparatus according to claim 1, further comprising means (14) for indirect heating of said first zone (12), arranged externally around said first zone (12) and second means for indirect heating of said second zone (24).

14. The apparatus according to claim 13, further comprising third (85) means for indirect heating of said third zone (30), arranged externally around said second zone (30).

15. The apparatus according to claim 1, wherein said third zone (34) is connected to said second zone (24) by means of at least one passage (32) which is defined on a bottom of said second zone (24) and which remains always open.

16. The apparatus according to claim 1, wherein said third zone (34) comprises at the bottom an outlet zone (42) within which transport means (44) are provided to advance what is received from the third zone (34) towards a discharge (46).

17. The apparatus according to claim 16, wherein said transport means (44) are integral in rotation (44) with said mixing device (36).

\* \* \* \* \*